United States Patent [19]
Seino

[11] Patent Number: 5,949,925
[45] Date of Patent: Sep. 7, 1999

[54] METHOD, DEVICE, AND SYSTEM FOR OPTICAL MODULATION IN WAVELENGTH DIVISION MULTIPLEXING

[75] Inventor: Minoru Seino, Kawasaki, Japan

[73] Assignee: Fujitsu Limited, Kawasaki, Japan

[21] Appl. No.: 09/028,245

[22] Filed: Feb. 24, 1998

[30] Foreign Application Priority Data

Sep. 5, 1997 [JP] Japan .................................. 9-240934

[51] Int. Cl.$^6$ ........................................................ G02F 1/01
[52] U.S. Cl. ........................ 385/1; 385/4; 385/9; 385/11; 385/24
[58] Field of Search .................................. 385/1, 4, 9, 10, 385/11, 12, 14, 15, 24

[56] References Cited

U.S. PATENT DOCUMENTS

| | | | |
|---|---|---|---|
| 4,153,328 | 5/1979 | Wang | 385/1 |
| 5,471,545 | 11/1995 | Negami et al. | 385/1 |
| 5,812,707 | 9/1998 | Yamane et al. | 385/11 |
| 5,822,471 | 10/1998 | McGinnis | 385/1 |

OTHER PUBLICATIONS

T. Nakazawa, et al., "Low–Sidelobe Polarization–Independent Narrowband Tunable Filter", *Photonics in Switching*, Apr. 1996, pp. 1–4.

T. Nakazawa, et al., "Devlopment of Lithium–Niobate Tunable Filters"; *Technical Report of IEICE*, 1996, pp. 79–84.

*Primary Examiner*—Phan T. H. Palmer
*Attorney, Agent, or Firm*—Staas & Halsey, LLP

[57] ABSTRACT

An optical modulator including an optical waveguide structure and a selective modulation unit. The optical waveguide structure guides wavelength division multiplexed light including a plurality of optical carriers having different wavelengths. A modulation signal is supplied to the selective modulation unit. The selective modulation unit operates on the optical waveguide structure to selectively modulate a selected optical carrier selected from the plural optical carriers according to the modulation signal. With this configuration, the selective modulation unit operates on the single optical waveguide structure to perform selective modulation, so that optical modulation of an arbitrary optical carrier in the wavelength division multiplexed light can be easily performed.

23 Claims, 11 Drawing Sheets

METHOD, DEVICE, AND SYSTEM FOR OPTICAL MODULATION IN WAVELENGTH DIVISION MULTIPLEXING

BACKGROUND OF THE INVENTION

1. Field of the Invention

The present invention relates generally to optical modulation in wavelength division multiplexing, and more particularly to a method, device, and system for optical modulation applied to wavelength division multiplexed light including a plurality of optical carriers having different wavelengths.

2. Description of the Related Art

In recent years, processing of massive amounts of information has been needed with development of an advanced information society, and optical fiber communications fit for a large capacity have been applied to a transmission network for transmitting information. While a transmission rate of information in optical fiber communications has already reached 2.4 Gb/s or 10 Gb/s, a further increase in transmission capacity will be needed in a motion picture captured communications system that is expected to be put to practical use in the future.

Wavelength division multiplexing (WDM) is known as one of the techniques for increasing a transmission capacity in optical fiber communications. In WDM, wavelength division multiplexed light including a plurality of optical carriers having different wavelengths are used. By individually modulating the optical carriers, a transmission capacity per channel of an optical fiber transmission line is increased according to the number of WDM channels.

In the case of carrying out WDM, it is sometimes required to perform optical modulation of only an arbitrary optical carrier( e.g., arbitrary single optical carrier) of the plural optical carriers. For example, such optical modulation is performed in the case of transmitting information such as gain and S/N ratio obtained as the result of processing in an optical repeater including an optical amplifier to a rear-stage optical repeater by means of an arbitrary optical carrier as a supervisory signal. In such a case, a conventional method includes the steps of spatially separating a desired optical carrier from wavelength division multiplexed light by using an optical demultiplexer, next modulating this optical carrier, and finally combining this optical carrier and the other optical carriers to obtain wavelength division multiplexed light again. In this manner, the conventional method has a problem that optical modulation of an arbitrary optical carrier in wavelength division multiplexed light cannot be easily performed. Furthermore, there arises another problem that many optical elements for optical demultiplexing and optical multiplexing are required to meet the a requirement of devices having complex configurations.

SUMMARY OF THE INVENTION

It is therefore an object of the present invention to provide a novel method which can easily perform optical modulation of an arbitrary optical carrier in wavelength division multiplexed light.

It is another object of the present invention to provide a device (optical modulator) having a simple configuration for carrying out such a method.

It is a further object of the present invention to provide a novel system including such a device and suitable for construction of a flexible optical network.

In accordance with a first aspect of the present invention, there is provided an optical modulator comprising an optical waveguide structure and selective modulation means. The optical waveguide structure guides wavelength division multiplexed light including a plurality of optical carriers having different wavelengths. A modulation signal is supplied to the selective modulation means. The selective modulation means operates on the optical waveguide structure to selectively modulate a selected optical carrier selected from the plurality of optical carriers according to the modulation signal.

According to the first aspect of the present invention, the selective modulation means operates on the single optical waveguide structure to perform selective modulation. Accordingly, it is possible to provide an optical modulator having a simple configuration which can easily perform optical modulation of an arbitrary optical carrier in wavelength division multiplexed light.

Preferably, the selective modulation means comprises a polarization converter having a conversion band giving a wavelength-dependent conversion efficiency, and the conversion band includes at least one wavelength of the plurality of optical carriers. Such a wavelength dependence of conversion efficiency in the polarization converter allows easy selective modulation of the selected optical carrier.

To achieve substantial polarization independence in the wavelength division multiplexed light, it is effective to adopt polarization diversity. For example, the wavelength division multiplexed light is separated into first and second polarization components having different polarization planes. Each of the first and second polarization components is next subjected to selective modulation, and the first and second polarization components are then combined.

In accordance with a second aspect of the present invention, there is provided a method for optical modulation applied to wavelength division multiplexed light including a plurality of optical carriers having different wavelengths, comprising the steps of (a) adjusting a polarization plane of each of the plurality of optical carriers to make the polarization plane substantially coincident with a first polarization plane; (b) converting the first polarization plane of a selected optical carrier selected from the plurality of optical carriers into a second polarization plane perpendicular to the first polarization plane according to a modulation signal; and (c) removing a polarization component having the second polarization plane.

In accordance with a third aspect of the present invention, there is provided a method for optical modulation applied to wavelength division multiplexed light including a plurality of optical carriers having different wavelengths, comprising the steps of (a) separating the wavelength division multiplexed light into a first polarization component having a first polarization plane and a second polarization component having a second polarization plane perpendicular to the first polarization plane; (b) supplying the first polarization component to a first polarization converter operating according to a modulation signal; (c) removing a polarization component converted by the first polarization converter; (d) supplying the second polarization component to a second polarization converter operating according to the modulation signal; (e) removing a polarization component converted by the second polarization converter; and (f) combining the first and second polarization components after the steps (a) to (e).

In accordance with a fourth aspect of the present invention, there is provided a system comprising an optical fiber transmission line and an optical modulator. The optical fiber transmission line transmits wavelength division multiplexed light including a plurality of optical carriers having different wavelengths. The optical modulator is provided on the optical fiber transmission line, and has a configuration according to the first aspect of the present invention.

Preferably, the optical modulator comprises a plurality of optical modulators, which operate on a plurality of selected optical carriers having different wavelengths.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
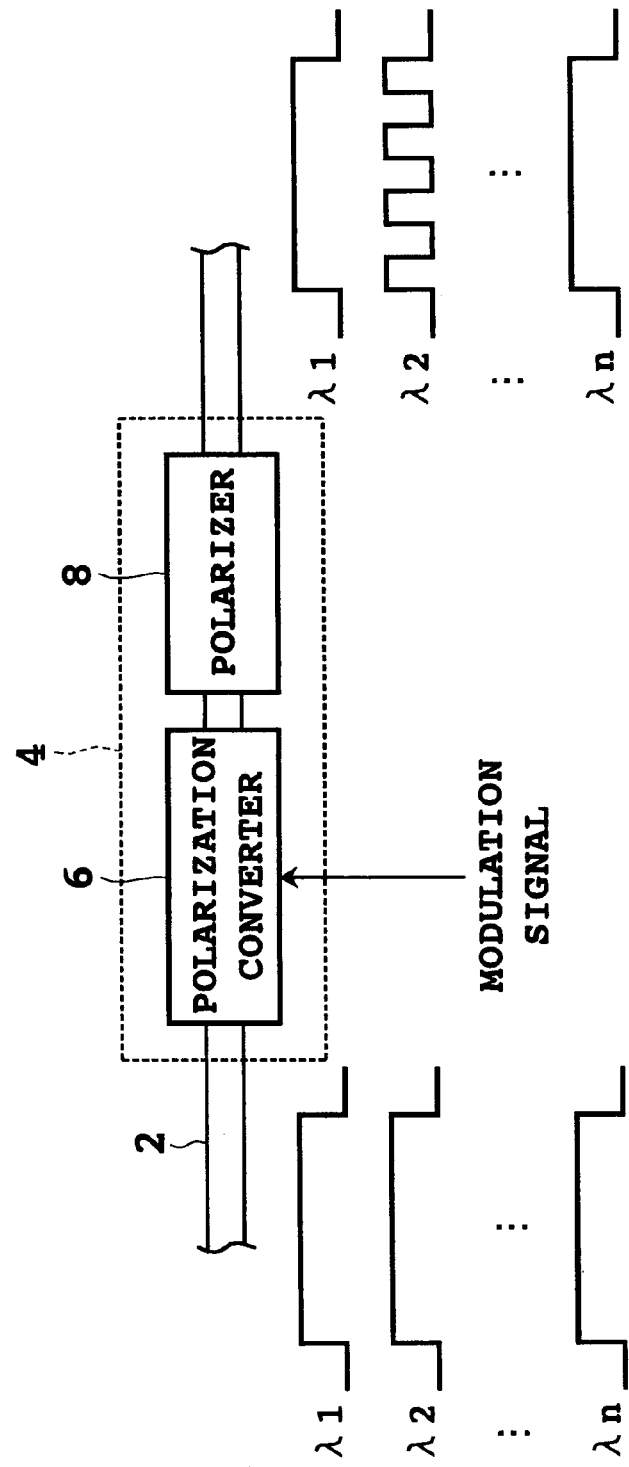
FIG. 1 is a block diagram showing a basic configuration of the optical modulator according to the present invention.

Some preferred embodiments of the present invention will now be described in detail with reference to the attached drawings. Throughout the drawings, substantially the same parts are denoted by the same reference numerals.

FIG. 1 is a block diagram showing a basic configuration of the optical modulator (device for optical modulation) according to the present invention. This optical modulator includes an optical waveguide structure 2 for guiding wavelength division multiplexed light (WDM light) and a selective modulation unit 4 operating on the optical waveguide structure 2. The WDM light includes a plurality of optical carriers having different wavelengths. The selective modulation unit 4 is supplied with a modulation signal to selectively modulate a selected optical carrier selected from the plural optical carriers according to the modulation signal. For example, assuming that the wavelengths of the plural optical carriers are $\lambda_1$ to $\lambda_n$ and that the wavelength of the selected optical carrier is $\lambda_2$, the selective modulation unit 4 modulates the selected optical carrier only to output resultant modulated light and passes all the optical carriers other than the selected optical carrier.

The waveforms shown in FIG. 1 correspond to the case of intensity modulation. In this case, each optical carrier is continuous wave light (CW light), and the selected optical carrier having a wavelength $\lambda_2$ is intensity-modulated according to the modulation signal. In the case that this optical modulator is applied to coherent optical communication, the selective modulation unit 4 may carry out phase modulation or frequency modulation of the selected optical carrier.

Preferably, the selective modulation unit 4 includes a polarization converter 6 operating according to the modulation signal and a polarizer 8 operatively connected to the polarization converter 6.

In this specification, the wording that an element and another element are operatively connected includes the case that these elements are directly connected, and also includes the case that these elements are so provided as to be related with each other to such an extent that an electrical signal or an optical signal can be mutually transferred between these elements.

The polarization converter 6 has a conversion band giving a wavelength-dependent conversion efficiency to the supplied WDM light. The polarizer 8 removes a specific polarization component of light supplied from the polarization converter 6. The combination of the polarization converter 6 and the polarizer 8 allows selective optical modulation of the selected optical carrier. Specific configurations of the polarization converter 6 and the polarizer 8 will be hereinafter described.

The present invention is not limited by the configuration that the WDM light comprises optical carriers discretely arranged on a wavelength axis. For example, the WDM light may be white light having a broad band. In this case, continuous modulation of the WDM light is allowed by changing the conversion band of the polarization converter 6 according to the modulation signal. A specific configuration of such continuous modulation will also be hereinafter described.

Figure 2:
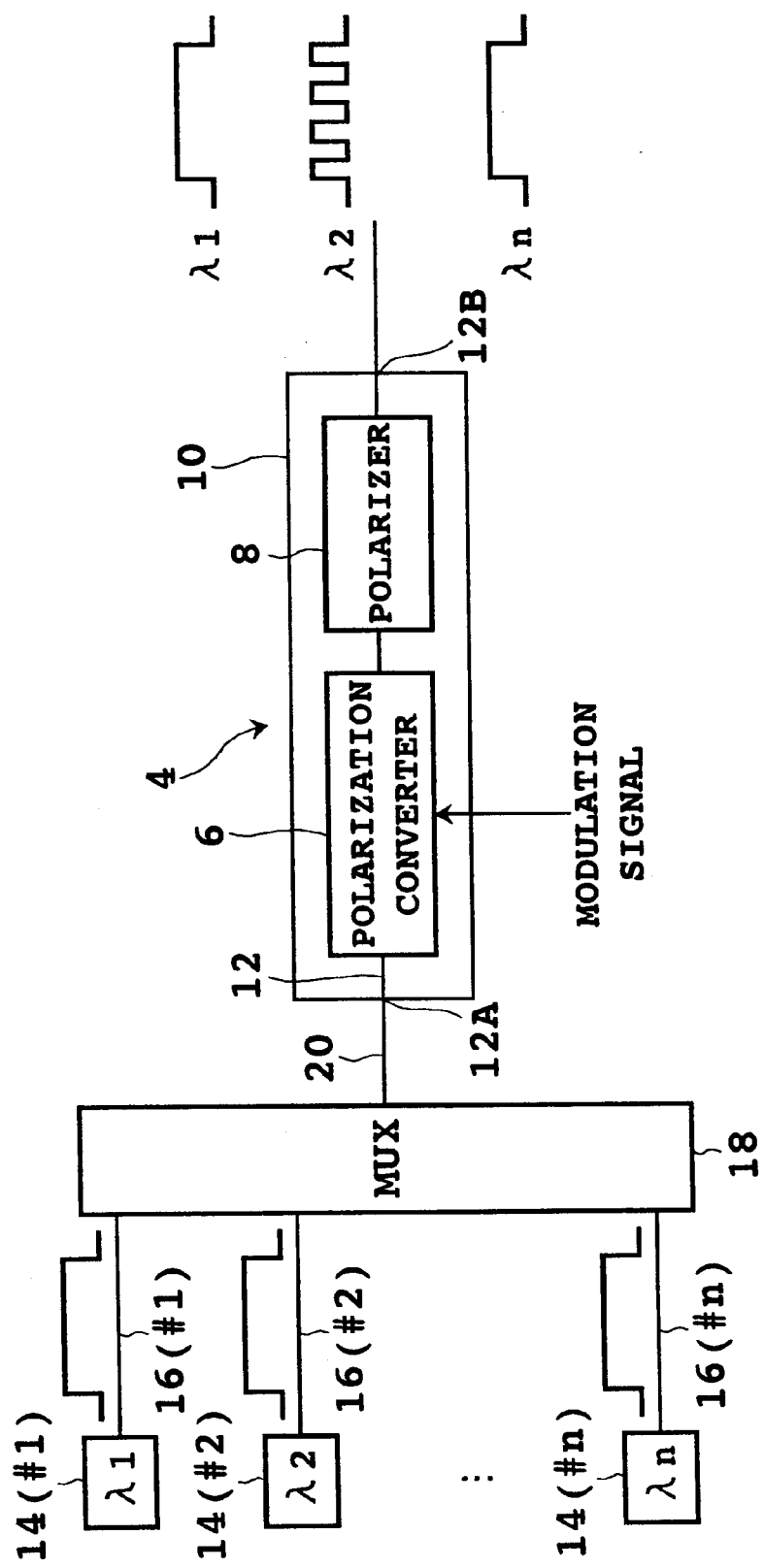
FIG. 2 is a block diagram showing a first preferred embodiment of the optical modulator according to the present invention.

FIG. 2 is a block diagram showing a first preferred embodiment of the optical modulator. In this preferred embodiment, the selective modulation unit 4 is provided on an optical waveguide substrate 10. The optical waveguide substrate 10 has an optical waveguide 12, and the optical waveguide structure 2 shown in FIG. 1 is provided by the optical waveguide 12. The optical waveguide substrate 10 is formed from a $LiNbO_3$ substrate, for example, and the optical waveguide 12 may be fabricated by thermal diffusion of Ti on the substrate. The polarization converter 6 may be formed on the optical waveguide 12, and the polarizer 8 may be formed on or in the vicinity of the optical waveguide 12. A first end 12A of the optical waveguide 12 upstream of the polarization converter 6 is an input port of the selective modulation unit 4, and a second end 12B of the optical waveguide 12 downstream of the polarizer 8 is an output port of the selective modulation unit 4.

The guided mode in the optical waveguide 12 includes two orthogonal polarized modes, i.e., a TE mode and a TM mode. The polarization plane of TE mode light is parallel to the sheet plane of FIG. 2 and the optical waveguide substrate 10, and the polarization plane of TM mode light is perpendicular to the sheet plane of FIG. 2 and the optical waveguide substrate 10. In this preferred embodiment, each optical carrier of the WDM light to be supplied to the input port 12A is maintained as one of the TE mode light and the TM mode light, so as to ensure stable operation of the polarization converter 6. To obtain such a constant polarized condition of WDM light, this preferred embodiment employs a plurality of light sources 14 (#1 to #n), a plurality of polarization maintaining fibers 16 (#1 to #n), and an optical multiplexer (MUX) 18. The light sources 14 (#1 to #n) output optical carriers having wavelengths $\lambda_1$ to $\lambda_n$, respectively. These optical carriers are supplied through the polarization maintaining fibers 16 (#1 to #n) to the optical multiplexer 18, in which the optical carriers are combined to become WDM light. The WDM light output from the optical multiplexer 18 is supplied through an optical fiber 20 to the input port 12A.

The operation of this optical modulator will be described based on the assumption that each optical carrier is TE mode light in the optical waveguide 12. The polarization converter 6 converts the TE mode light into TM mode light according to a modulation signal supplied. The polarizer 8 receives the TE mode light and the TM mode light output from the polarization converter 6 to remove the TM mode light and pass the TE mode light.

The polarization converter 6 has a conversion band giving a wavelength-dependent conversion efficiency as mentioned above. Accordingly, by setting the conversion band so that it includes at least one wavelength of the optical carriers, the conversion from the TE mode light of only the optical carrier having a wavelength falling in the conversion band to the TM mode light according to the modulation signal can be carried out in the polarization converter 6. For example, in the case that only a wavelength $\lambda_2$ is included in the conversion band of the polarization converter 6, selective modulation of the optical carrier having a wavelength $\lambda_2$ can be effected. In this case, the polarization conversion from the TE mode light to the TM mode light in the polarization converter 6 is carried out according to the modulation signal, so that the waveform of the modulation signal and the waveform of an optical output from the optical modulator are reverse in phase.

Figure 3:
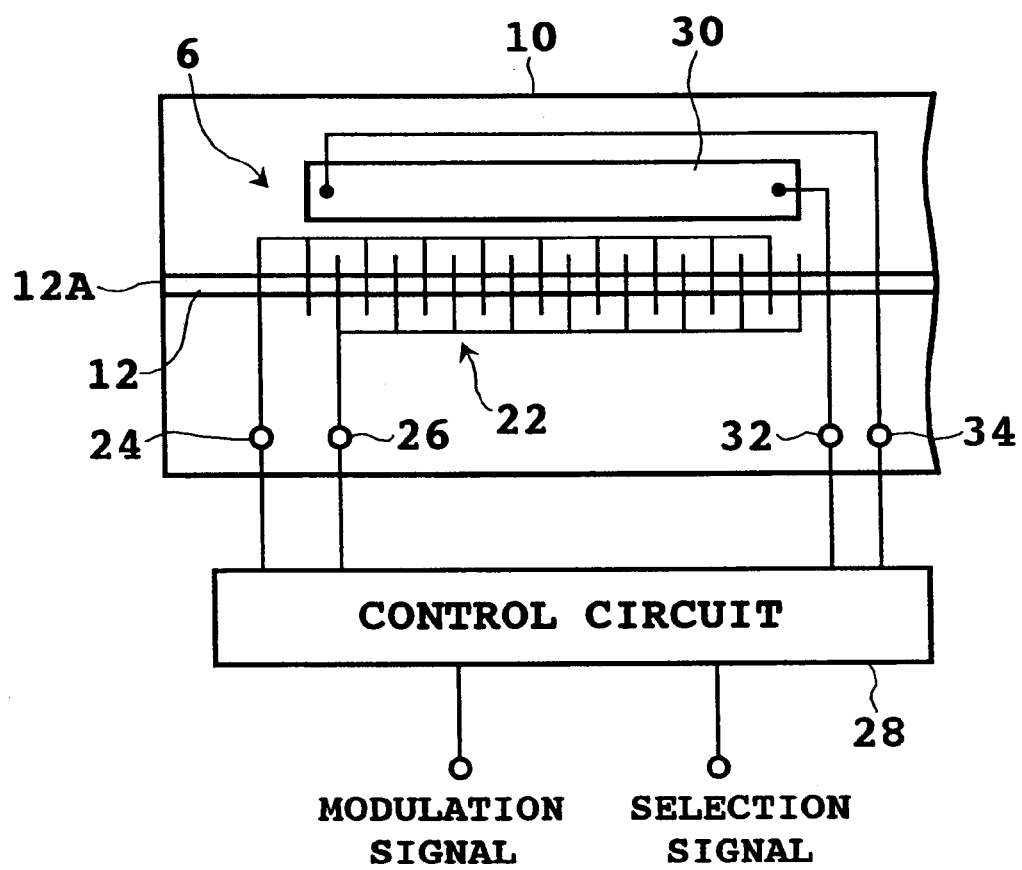
FIG. 3 is a view showing a preferred embodiment of the polarization converter applicable to the present invention.

Referring to FIG. 3, there is shown a preferred embodiment of the polarization converter 6. In this preferred embodiment, the polarization converter 6 includes an interdigital transducer (IDT) 22 formed on the optical waveguide 12 of the optical waveguide substrate 10. The IDT 22 is comprised of a pair of comb-shaped electrode patterns. The IDT 22 is connected through terminals 24 and 26 to a control circuit 28. The polarization converter 6 further includes a heater 30 provided along the optical waveguide 12. The heater 30 is connected through terminals 32 and 34 to the control circuit 28. The temperature of the optical waveguide 12 is changed with a current flowing in the heater 30, thereby changing the refractive index of the optical waveguide 12.

A modulation signal and a selection signal are supplied to the control circuit 28. The control circuit 28 switches on and off a d.c. voltage (e.g., about 10 V) to be supplied to the IDT 22 according to the modulation signal supplied. For example, when the modulation signal is at a high level, the supply of the d.c. voltage to the IDT 22 goes on, and the conversion from TE mode light to TM mode light is performed. Conversely, when the modulation signal is at a low level, the supply of the d.c. voltage to the IDT 22 goes off, and the conversion from TE mode light to TM mode light is not performed. The control circuit 28 also adjusts a current flowing in the heater 30 to control the temperature of the optical waveguide 12.

Figure 4A:
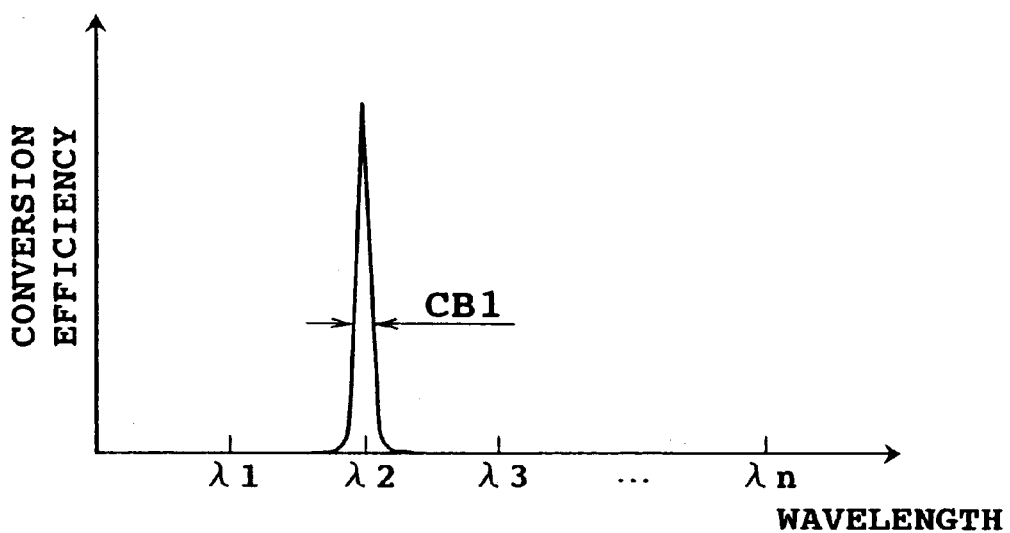
FIGS. 4A and 4B are graphs illustrating examples of a conversion band of the polarization converter applicable to the present invention.

Referring to FIG. 4A, there is shown a conversion band of the polarization converter 6. In FIG. 4A, the vertical axis represents conversion efficiency, and the horizontal axis represents wavelength. The wavelength characteristic of conversion efficiency shown in FIG. 4A is relatively steep. The conversion band defined by a wavelength range giving a conversion efficiency higher than a predetermined conversion efficiency is relatively narrow as shown by reference symbol CB1 because of the steep wavelength characteristic of conversion efficiency. The center wavelength in the conversion band CB1 is variable according to the temperature (refractive index) of the optical waveguide 12 shown in FIG. 3. Accordingly, an optical carrier having a wavelength included in the conversion band CB1 can be selected by adjusting a current flowing in the heater 30 by the control circuit 28. In the example shown in FIG. 4A, a wavelength $\lambda_2$ is included in the conversion band CB1, so that only an optical carrier having a wavelength $\lambda_2$ is subjected to conversion from TE mode light to TM mode light. The other optical carriers (e.g., an optical carrier having a wavelength $\lambda_1$) are not subjected to the above conversion, but passed through the polarization converter 6.

Figure 4B:
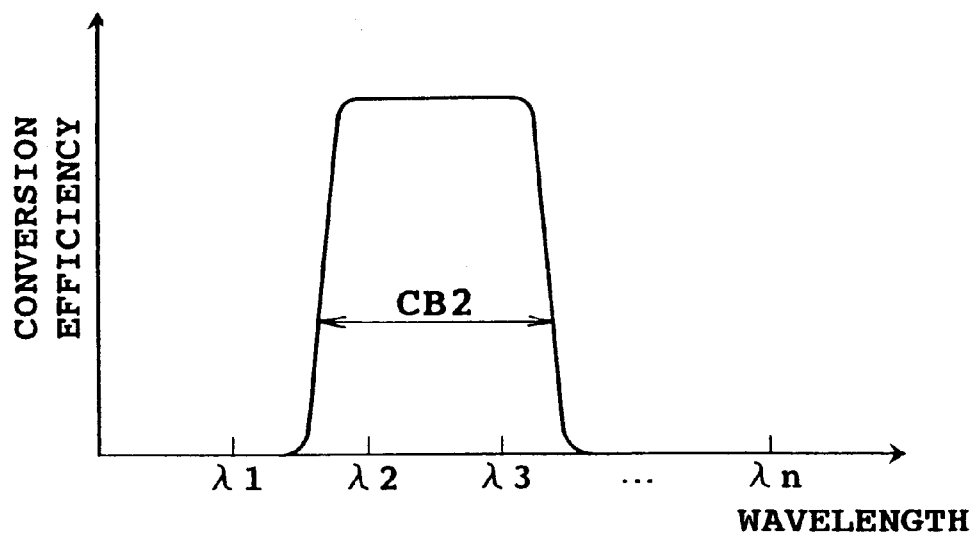

A desired conversion band can be obtained according to the form of the IDT 22. For example, a relatively wide conversion band CB2 as shown in FIG. 4B can be obtained by suitably designing the IDT 22. In the example shown in FIG. 4B, wavelengths $\lambda_2$ and $\lambda_3$ are included in the conversion band CB2, and accordingly optical carriers having wavelengths $\lambda_2$ and $\lambda_3$ are subjected to conversion from TE mode light to TM mode light. It is generally known that the larger the number of stages in the IDT 22 (the number of fingers of each electrode in the IDT 22), the narrower the conversion band. Further, the conversion band can be made relatively wide or sidebands can be reduced by setting the electrode pitch of the IDT 22 according to a Gaussian distribution.

Figure 5:
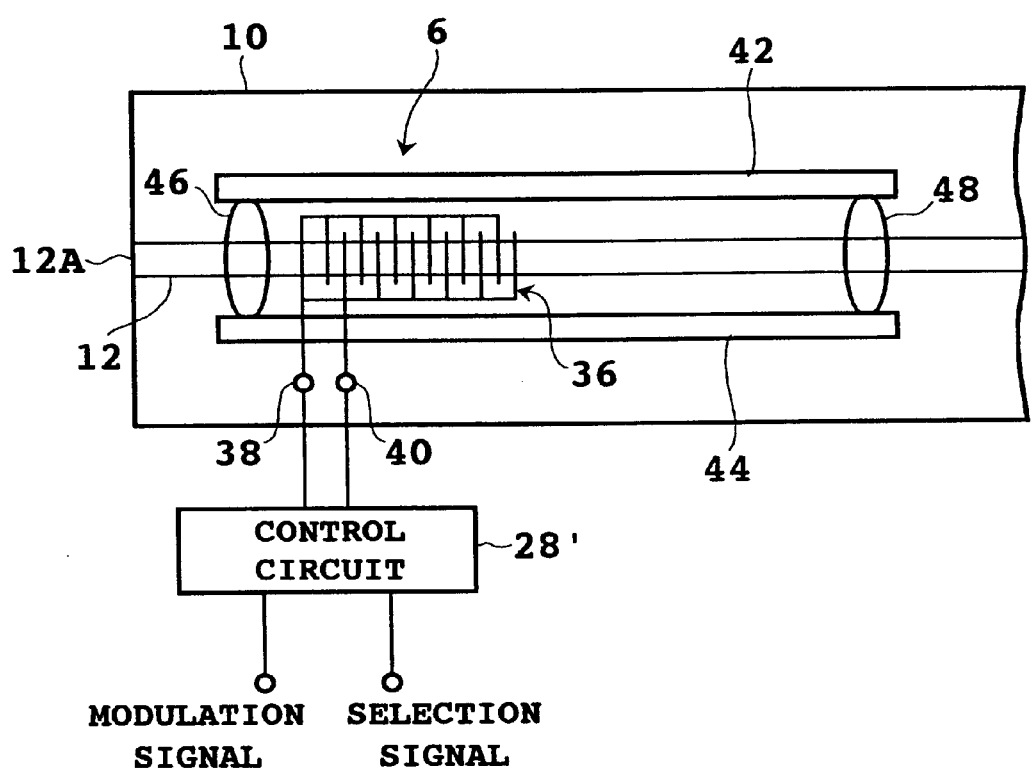
FIG. 5 is a view showing another preferred embodiment of the polarization converter applicable to the present invention.

Referring to FIG. 5, there is shown another preferred embodiment of the polarization converter 6. In this preferred embodiment, an IDT 36 is provided on the optical waveguide 12 of the optical waveguide substrate 10, so as to generate surface acoustic waves (SAW) on or in the vicinity of the surface of the optical waveguide substrate 10. The IDT 36 is connected through terminals 38 and 40 to a control circuit 28'. To propagate the generated SAW in a substantially one direction along the optical waveguide 12, SAW clads 42 and 44 are provided on the opposite sides of the optical waveguide 12. Further, SAW absorbers 46 and 48 are provided at opposite end portions of the SAW clads 42 and 44.

A modulation signal and a selection signal are supplied to the control circuit 28'. The control circuit 28' switches on and off an a.c. signal to be supplied to the IDT 36 according to the modulation signal, and adjusts the frequency of the a.c. signal according to the selection signal. When the a.c. signal is supplied to the IDT 36, an optical carrier having a wavelength included in a conversion band determined by the frequency of the a.c. signal is subjected to conversion from TE mode light to TM mode light, whereas when the supply of the a.c. signal to the IDT 36 goes off, the conversion from TE mode light to TM mode light is not performed.

In this preferred embodiment, the conversion band or its center wavelength is variable according to the frequency of the a.c. signal. Accordingly, a desired optical carrier can also be selectively modulated in this preferred embodiment. For example, the center wavelength in the conversion band can be continuously changed from 1.58 μm to 1.48 μm by sweeping the frequency of the a.c. signal from 165 MHz to 180 MHz at 25° C. Alternatively, the conversion band may be adjusted by maintaining the frequency of the a.c. signal to be supplied to the IDT 36 constant and adjusting the temperature of the optical waveguide 12 on the basis of the preferred embodiment shown in FIG. 3.

Figure 6:
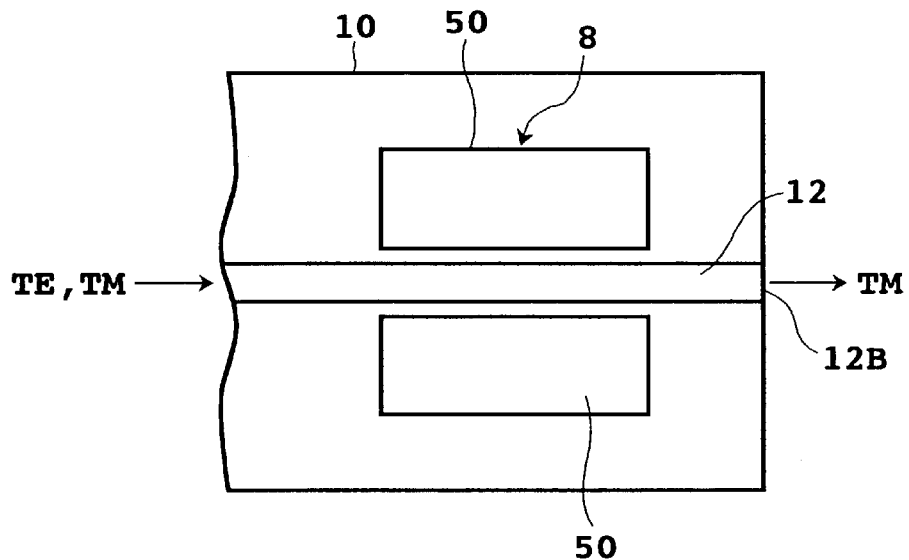
FIG. 6 is a plan view showing a preferred embodiment of the polarizer applicable to the present invention.

FIG. 6 is a plan view showing a preferred embodiment of the polarizer 8. In this preferred embodiment, the polarizer 8 consists of a pair of high refractive index portions 50 provided along the optical waveguide 12. The optical waveguide 12 has a refractive index higher than the refractive index of the clad (undoped with Ti) of the optical waveguide substrate 10, and each high refractive index portion 50 has a refractive index equal to or higher than the refractive index of the optical waveguide 12. The shape parameters (e.g., length and thickness) of each high refractive index portion 50 are suitably set. By suitably setting the refractive index and the shape parameters of each high refractive index portion 50, only the TE mode light out of TE mode light and TM mode light guided by the optical waveguide 12 can be removed. Accordingly, in the case that this polarizer 8 is used in the preferred embodiment shown in FIG. 2, each optical carrier of the WDM light to be supplied to the input port 12A is TM mode light. The high refractive index portions 50 can be obtained in the same fabrication process as that for the optical waveguide 12, so that the polarizer 8 shown in FIG. 6 can be easily fabricated.

Figure 7:
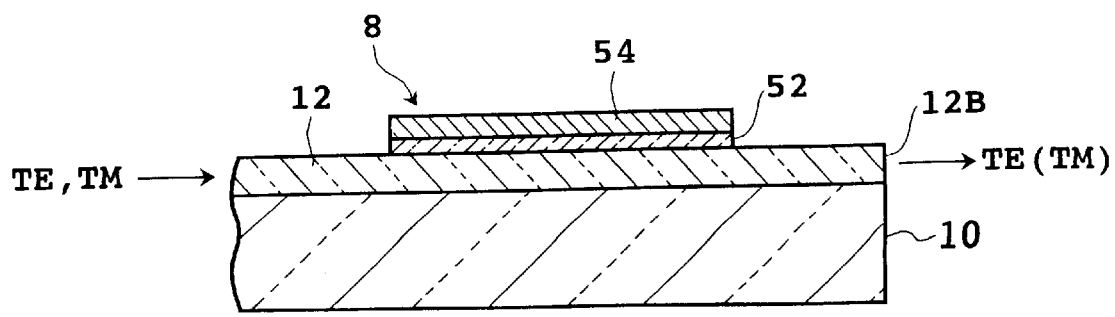
FIG. 7 is a sectional view showing another preferred embodiment of the polarizer applicable to the present invention.

FIG. 7 is a sectional view showing another preferred embodiment of the polarizer 8. In this preferred embodiment, the polarizer 8 includes a high refractive index layer 52 formed on the optical waveguide 12 and a metal layer 54 formed on the high refractive index layer 52. By suitably setting the thickness and the refractive index of the high refractive index layer 52, only the TM mode light out of TE mode light and TM mode light guided by the optical waveguide 12 can be selectively removed. Alternatively, by changing the thickness and the refractive index of the high refractive index layer 52, the TE mode light can be selectively removed. The refractive index of the high refractive index layer 52 is equal to or higher than the refractive index of the optical waveguide 12.

Although not shown, the high refractive index layer 52 may be replaced by a buffer layer of Si in the sectional configuration shown in FIG. 7, thereby obtaining a polarizer for selectively removing TM mode light.

In the above preferred embodiments, the polarization converter 6 converts TE mode light into TM mode light or vice versa according to a modulation signal. However, the present invention is not limited to this configuration. For example, the polarization converter 6 may slightly change a conversion efficiency according to a modulation signal, thereby performing superimposition modulation. This configuration will now be described more specifically.

Figure 8:
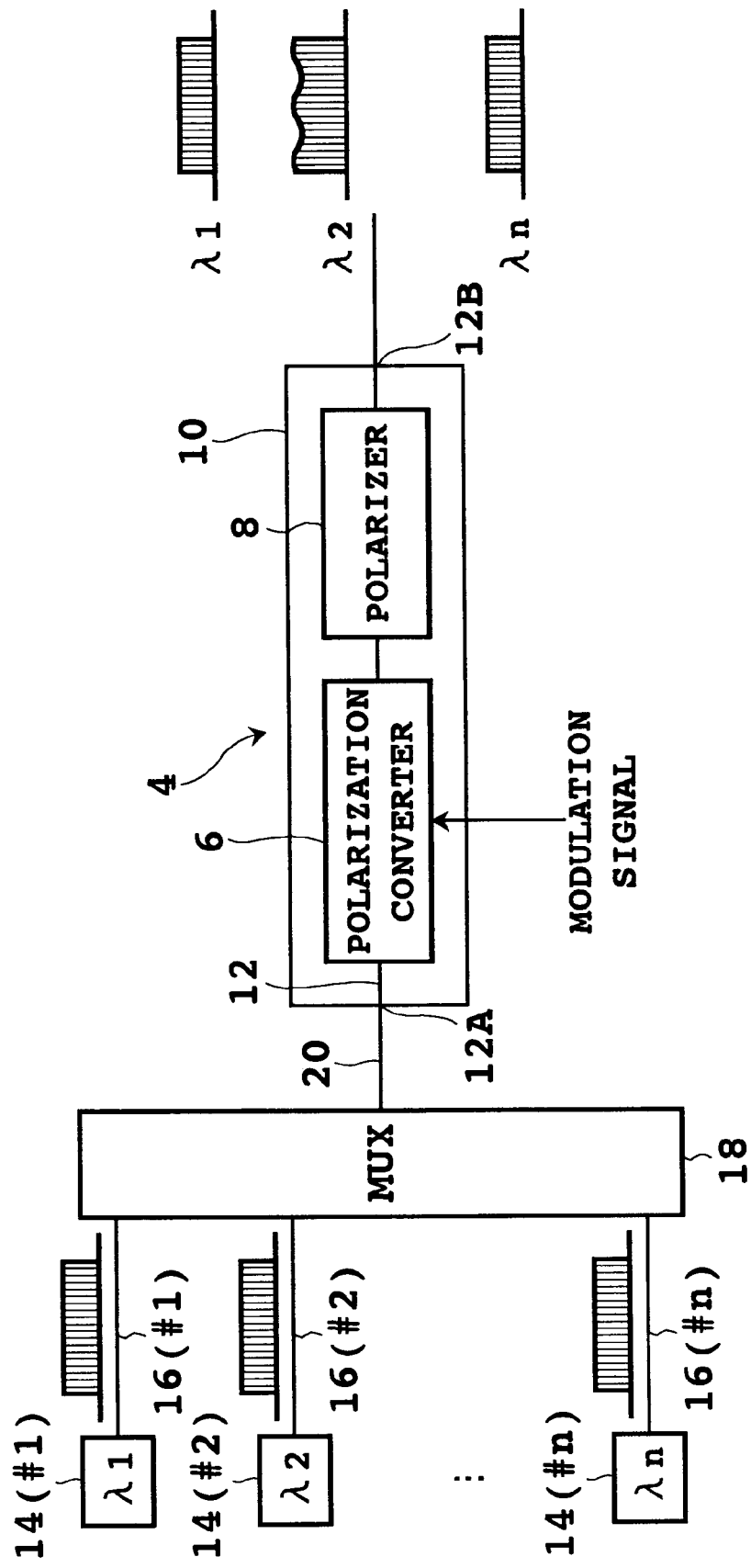
FIG. 8 is a block diagram showing a second preferred embodiment of the optical modulator according to the present invention.

FIG. 8 is a block diagram showing a second preferred embodiment of the optical modulator. In this preferred embodiment, each of optical carriers to be output from light sources 14 (#1 to #n) is modulated by a main signal having a relatively high frequency (high bit rate), and the degree of modulation of a selected optical carrier by a modulation signal is lower than the degree of modulation by the main signal, thereby superimposing the modulation signal on the main signal. The bit rate of the main signal is 10 Gb/s, for example, and the frequency of the modulation signal is 10 KHz, for example. In the example shown in FIG. 8, the optical carrier having a wavelength $\lambda_2$ is a selected optical carrier, and the modulation signal is superimposed selectively on the main signal in the selected optical carrier. The modulation of each optical carrier by the main signal may be carried out by direct modulation of a laser diode or modulation by use of an external modulator. Such superimposition of the modulation signal on the main signal is effective for supervisory control in an optical repeater, for example.

Figure 9:
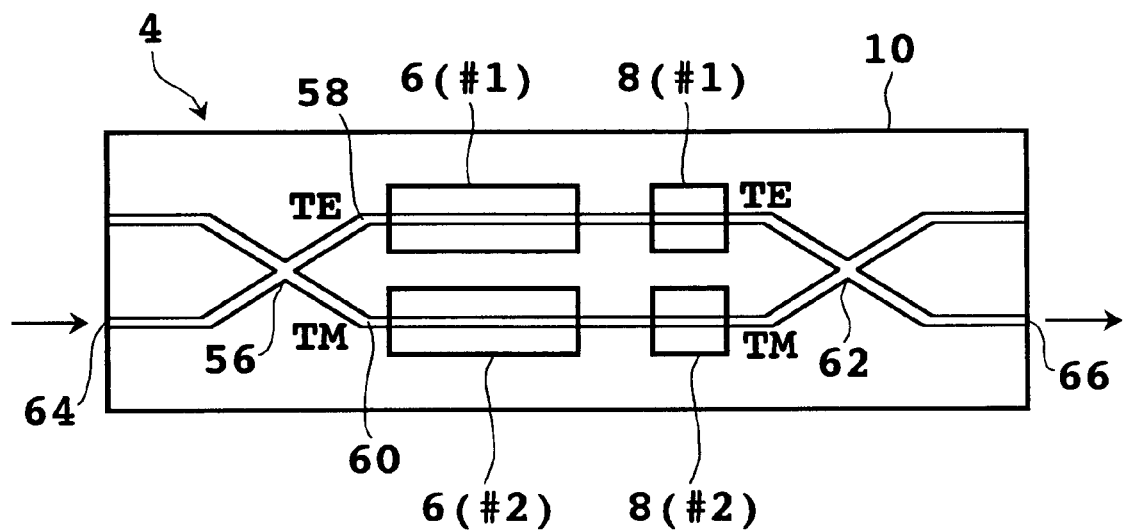
FIG. 9 is a view showing a third preferred embodiment of the optical modulator according to the present invention.

FIG. 9 is a view showing a third preferred embodiment of the optical modulator. In this preferred embodiment, the optical waveguide structure 2 shown in FIG. 1 includes a beam splitter 56 for separating WDM light supplied to an input port 64 into TE mode light and TM mode light, optical waveguides 58 and 60 for propagating the TE mode light and the TM mode light, and a beam combiner 62 operatively connected to the optical waveguides 58 and 60. Each of the beam splitter 56 and the beam combiner 62 is provided by an X-intersection type optical waveguide structure, and each of the optical waveguides 58 and 60 may be fabricated by selective thermal diffusion of Ti into the optical waveguide substrate 10. An output port 66 of this optical modulator is provided by one of the output ends of the beam combiner 62.

In this preferred embodiment, the selective modulation unit 4 shown in FIG. 1 includes a mode converter 6 (#1) and a polarizer 8 (#1) both provided on the optical waveguide 58, and a mode converter 6 (#2) and a polarizer 8 (#2) both provided on the optical waveguide 60. The mode converter 6 (#1) converts the TE mode light from the beam splitter 56 into TM mode light according to a modulation signal. The polarizer 8 (#1) removes the TM mode light obtained by the mode converter 6 (#1). The mode converter 6 (#2) converts the TM mode light from the beam splitter 56 into TE mode light according to the modulation signal. The polarizer 8 (#2) removes the TE mode light obtained by the mode converter 6 (#2). The TE mode light and the TM mode light respectively output from the polarizers 8 (#1) and 8 (#2) are combined together by the beam splitter 62, and resultant light is output from the output port 66.

According to this configuration, optical modulation of a selected optical carrier can be performed separately on the polarization components having polarization planes orthogonal to each other. Therefore, there is no limitation on the polarized condition of each optical carrier of the WDM light to be supplied to the input port 64 in accordance with the principle of so-called polarization diversity.

Each of the polarization converters 6 (#1) and 6 (#2) may adopt the configuration shown in FIG. 3 or 5. In FIG. 9, the control circuit 28 or 28' is not shown. The polarizer 8 (#1) for removing TM mode light may adopt the configuration shown in FIG. 7. The polarizer 8 (#2) for removing TE mode light may adopt the configuration shown in FIG. 6 or 7.

Figure 10:
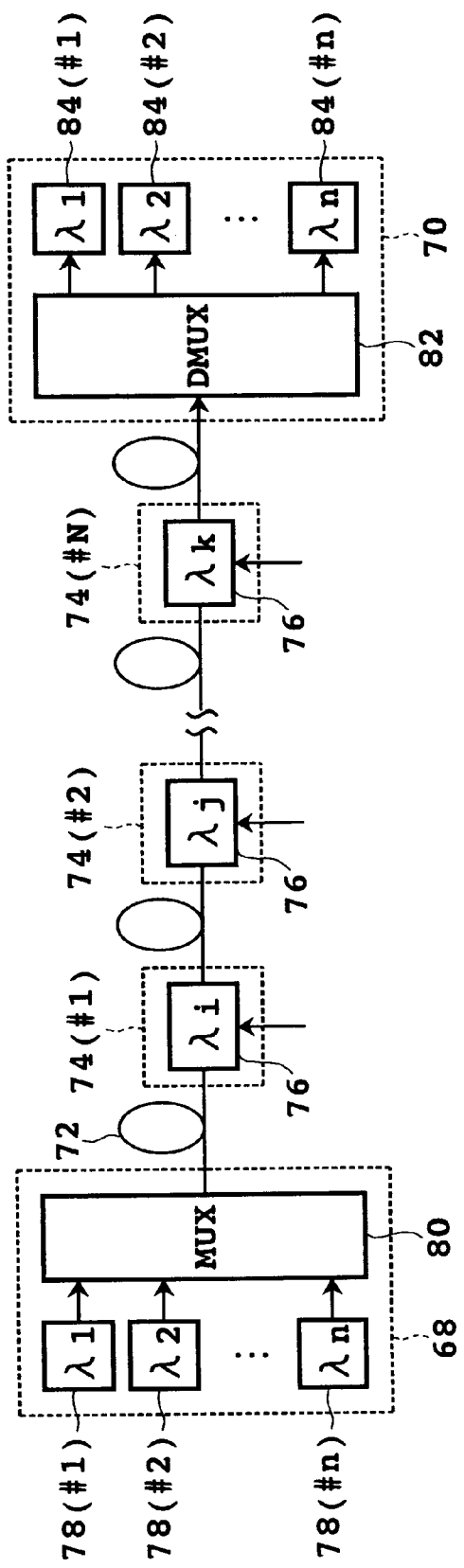
FIG. 10 is a block diagram showing a preferred embodiment of the system according to the present invention.

FIG. 10 is a block diagram showing a preferred embodiment of the system according to the present invention. This system includes terminal stations 68 and 70, an optical fiber transmission line 72 for connecting the terminal stations 68 and 70, and a plurality of nodes 74 (#1 to #N) provided on the optical fiber transmission line 72.

Each of the nodes 74 (#1 to #N) includes an optical modulator 76 according to the present invention. The terminal station 68 includes a plurality of optical senders 78 (#1 to #n) and an optical multiplexer (MUX) 80. The optical senders 78 (#1 to #n) output optical signals (optical carriers) having wavelengths $\lambda_1$ to $\lambda_n$, respectively. These optical signals are wavelength division multiplexed by the optical multiplexer 80, and resultant WDM signal light is output to the optical fiber transmission line 72. Each optical modulator 76 modulates an optical signal in a wavelength channel (e.g., wavelength $\lambda_i$, $\lambda_j$ or $\lambda_k$ (i, j, and k are natural numbers not greater than n)) temporarily or permanently given to the corresponding node 74 as a selected optical carrier according to a modulation signal. The terminal station 70 includes an optical demultiplexer (DMUX) 82 for separating the transmitted WDM signal light into optical signals in individual channels and a plurality of optical receivers 84 (#1 to #n) for receiving the separated optical signals. The optical receivers 84 (#1 to #n) regenerate transmitted data from the optical senders 78 or the optical modulators 76 according to the optical signals having the wavelengths $\lambda_1$ to $\lambda_n$, respectively.

According to this configuration, modulation can be sequentially performed in the nodes 74 separately for the wavelength channels of the WDM signal light. That is, in the case of performing optical modulation of an arbitrary optical carrier of WDM light in a conventional system, each node must have an optical multiplexer and an optical demultiplexer, and an optical modulator must be applied to a separated arbitrary optical carrier. To the contrary, according to the present invention, it is unnecessary to provide an optical multiplexer and an optical demultiplexer in each node, thereby simplifying the system configuration. Further, in the system shown in FIG. 10, the selected optical carrier can be electrically set according to a selection signal in each optical modulator 76, thereby allowing construction of a flexible optical network. In consideration of information transmission from the terminal station 68 to the terminal station 70 in the system shown in FIG. 10, it is preferable to apply the superimposition modulation mentioned above with reference to FIG. 8.

Each optical modulator 76 may be designed to operate on a plurality of selected optical carriers having different wavelengths, or two or more optical modulators 76 may be designed to operate on a plurality of selected optical carriers having the same wavelength. Particularly in the latter case, it is preferable to adopt the superimposition modulation mentioned above with reference to FIG. 8 and use different modulation signals to be superimposed in the two or more optical modulators 76.

Although not shown, one or plural optical amplifiers for compensating for attenuation of the optical signals may be provided in the optical fiber transmission line 72.

Figure 11:
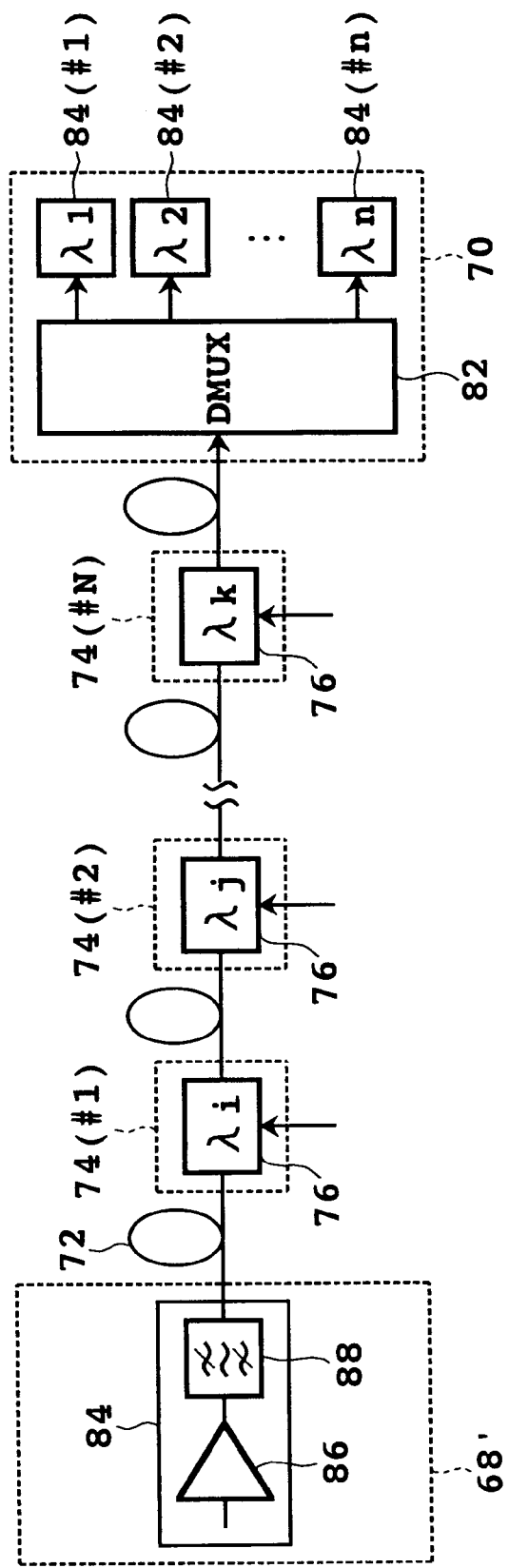
FIG. 11 is a block diagram showing another preferred embodiment of the system according to the present invention.

FIG. 11 is a block diagram showing another preferred embodiment of the system according to the present invention. In contrast with the system shown in FIG. 10, this preferred embodiment is characterized by a modified terminal station 68'. The terminal station 68' has a white light source 84 for obtaining WDM light having a continuous bandwidth. The white light source 84 includes an optical amplifier 86 for outputting amplified spontaneous emission (ASE) and an optical band-pass filter 88 operatively connected between the optical amplifier 86 and the optical fiber transmission line 72. The optical amplifier 86 is an erbium doped fiber amplifier (EDFA) including a doped fiber doped with a rare earth element such as Er (erbium) and an optical circuit for supplying pump light having a predetermined wavelength to the doped fiber.

Figure 12:
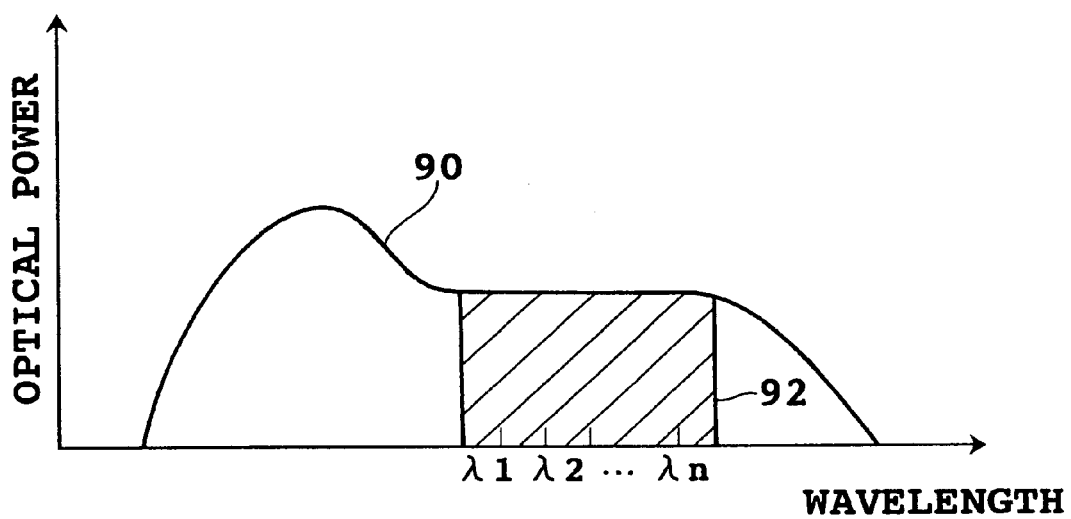
FIG. 12 is a graph illustrating the principles of operation of the system shown in FIG. 11.

The ASE output from the optical amplifier 86 has a continuous spectrum 90 as shown in FIG. 12. Accordingly, by using a relatively flat region 92 of the spectrum 90, WDM light having optical power constant with respect to wavelength can be obtained. The optical band-pass filter 88 functions to extract the region 92. In this preferred embodiment, the wavelength of a selected optical carrier operated by each optical modulator 76 is included in the region 92.

According to the system configuration shown in FIG. 11, the modulation signal in each optical modulator 76 can be independently demodulated in the terminal station 70. The band to be modulated in each optical modulator 76 can be made sufficiently narrow in this preferred embodiment, so that the number of WDM channels can be easily increased to thereby allow large-capacity transmission. Further, since the wavelength of a selected optical carrier in each optical modulator 76 can be electrically changed, a flexible optical network system can be constructed.

In the case that the white light source 84 as shown in FIG. 11 is adopted and that the conversion band of each optical modulator 76 is sufficiently narrow as shown in FIG. 4A, the WDM light can be continuously modulated by changing the conversion band in the region 92 shown in FIG. 12, thereby allowing modulation with wavelength and conversion efficiency used as degrees of freedom and accordingly allowing a great increase in transmission capacity.

In the preferred embodiments shown in FIGS. 3 and 5, the modulation of a selected optical carrier is made by changing the conversion efficiency according to the modulation signal. In modification, however, the modulation of a selected optical carrier may be made by changing the center wavelength in the conversion band according to the modulation signal.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical modulator comprising:
   an optical waveguide structure guiding wavelength division multiplexed light including a plurality of optical carriers having different wavelengths; and
   selective modulation means supplied with a modulation signal to operate on said optical waveguide structure, for selectively modulating a selected optical carrier selected from said plurality of optical carriers according to said modulation signal.

2. An optical modulator according to claim 1, wherein:
   said optical waveguide structure comprises a beam splitter separating said wavelength division multiplexed light into a first polarization component having a first polarization plane and a second polarization component having a second polarization plane perpendicular to said first polarization plane, first and second optical waveguides propagating said first and second polarization components, respectively, and a beam combiner operatively connected to said first and second optical waveguides;
   said selective modulation means comprises a first polarization converter provided on said first optical waveguide converting said first polarization component into the second polarization component according to said modulation signal, a first polarizer operatively connected to said first polarization converter removing the second polarization component, a second polarization converter provided on said second optical waveguide converting said second polarization component into the first polarization component according to said modulation signal, and a second polarizer operatively connected to said second polarization converter for removing the first polarization component; and
   each of said first and second polarization converters has a conversion band giving a wavelength dependent conversion efficiency, said conversion band including at least one wavelength of said optical carriers.

3. An optical modulator according to claim 2, wherein said optical waveguide structure is provided by an optical waveguide substrate.

4. An optical modulator according to claim 3, wherein each of said first and second polarization converters includes an interdigital transducer (IDT) formed on said optical waveguide substrate.

5. An optical modulator according to claim 3, wherein:

said first and second polarization components correspond to a TE mode and a TM mode in said optical waveguide substrate, respectively; and said first polarizer comprises a metal layer formed on said first optical waveguide.

6. An optical modulator according to claim 3, wherein:

said first and second polarization components correspond to a TE mode and a TM mode in said optical waveguide substrate, respectively; and said second polarizer comprises a pair of high refractive index portions provided along said second optical waveguide.

7. An optical modulator according to claim 3, wherein said optical waveguide substrate is formed of $LiNbO_3$.

8. An optical modulator according to claim 1, wherein:

each of said plurality of optical carriers comprises a first polarization component having a first polarization plane;

said selective modulation means comprises a polarization converter supplied with said plurality of optical carriers converting said first polarization component into a second polarization component having a second polarization plane perpendicular to said first polarization plane according to said modulation signal, and a polarizer operatively connected to said polarization converter removing said second polarization component; and said polarization converter has a conversion band giving a wavelength-dependent conversion efficiency, said conversion band including at least one wavelength of said optical carriers.

9. An optical modulator according to claim 8, wherein:

said optical waveguide structure is provided by an optical waveguide substrate; and said polarization converter includes an interdigital transducer (IDT) formed on said optical waveguide substrate.

10. An optical modulator according to claim 9, wherein:

said polarization converter further includes means for supplying an a.c. signal to said IDT;

the conversion band of said polarization converter being adjusted according to the frequency of said a.c. signal.

11. An optical modulator according to claim 8, further comprising a plurality of polarization maintaining fibers maintaining the polarized conditions of said plurality of optical carriers, respectively, and supplying said optical carriers to said polarization converter.

12. An optical modulator according to claim 9, wherein:

said polarization converter further includes means for supplying a d.c. signal to said IDT and means for changing the temperature of said optical waveguide structure;

the conversion band of said polarization converter being adjusted according to the temperature of said optical waveguide structure.

13. An optical modulator according to claim 1, wherein said selective modulation means comprises a polarization converter having a conversion band giving a wavelength-dependent conversion efficiency, a polarizer operatively connected to said polarization converter, and means for changing said conversion band according to said modulation signal.

14. An optical modulator according to claim 13, wherein said wavelength division multiplexed light has a continuous bandwidth, and said conversion band is changed in said bandwidth, whereby said wavelength division multiplexed light is continuously modulated.

15. An optical modulator according to claim 1, wherein each of said plurality of optical carriers is modulated by a main signal, and a degree of modulation of said selected optical carrier by said modulation signal is lower than a degree of modulation by said main signal, whereby said modulation signal is superimposed on said main signal.

16. An optical modulator according to claim 1, wherein said wavelength division multiplexed light has a continuous bandwidth.

17. An optical modulator comprising:

an optical waveguide structure guiding wavelength division multiplexed light including a plurality of optical carriers having different wavelengths; and a modulation unit receiving a modulation signal to operate on said optical waveguide structure, said modulation unit selectively modulating a selected optical carrier selected from said plurality of optical carriers according to the modulation signal.

18. A system comprising:

an optical fiber transmission line for transmitting wavelength division multiplexed light including a plurality of optical carriers having different wavelengths; and an optical modulator provided on said optical fiber transmission line, said optical modulator comprising an optical waveguide structure guiding said wavelength division multiplexed light and selective modulation means supplied with a modulation signal to operate on said optical waveguide structure, for selectively modulating a selected optical carrier selected from said plurality of optical carriers according to said modulation signal.

19. A system according to claim 18, wherein said optical modulator comprises a plurality of optical modulators.

20. A system according to claim 19, wherein said plurality of optical modulators operate on a plurality of selected optical carriers having different wavelengths.

21. A system according to claim 18, wherein said selective modulation means includes a polarization converter having a conversion band giving a wavelength-dependent conversion efficiency, said conversion band including at least one wavelength of said optical carriers.

22. A method for optical modulation applied to wavelength division multiplexed light including a plurality of optical carriers having different wavelengths, comprising:

(a) adjusting a polarization plane of each of said plurality of optical carriers to make said polarization plane substantially coincident with a first polarization plane;

(b) converting said first polarization plane of a selected optical carrier selected from said plurality of optical carriers into a second polarization plane perpendicular to said first polarization plane according to a modulation signal; and (c) removing a polarization component having said second polarization plane.

23. A method for optical modulation applied to wavelength division multiplexed light including a plurality of optical carriers having different wavelengths, comprising:

(a) separating said wavelength division multiplexed light into a first polarization component having a first polarization plane and a second polarization component having a second polarization plane perpendicular to said first polarization plane;

(b) supplying said first polarization component to a first polarization converter operating according to a modulation signal;

(c) removing a polarization component converted by said first polarization converter;

(d) supplying said second polarization component to a second polarization converter operating according to said modulation signal;

(e) removing a polarization component converted by said second polarization converter; and (f) combining said first and second polarization components after said steps (a) to (e).

* * * * *